United States Patent
Kim et al.

(10) Patent No.: US 7,551,584 B2
(45) Date of Patent: *Jun. 23, 2009

(54) APPARATUS AND METHOD FOR CONTROLLING REVERSE-LINK DATA TRANSMISSION RATE

(75) Inventors: Ki Jun Kim, Seoul (KR); Jong Hoe An, Kyonggi-do (KR); Young Woo Yun, Seoul (KR); Soon Yil Kwon, Kyonggi-do (KR); Cheol Woo You, Seoul (KR)

(73) Assignee: LG Electronics Inc., Seoul (KR)

( * ) Notice: Subject to any disclaimer, the term of this patent is extended or adjusted under 35 U.S.C. 154(b) by 1031 days.

This patent is subject to a terminal disclaimer.

(21) Appl. No.: 10/794,744

(22) Filed: Mar. 5, 2004

(65) Prior Publication Data
US 2004/0215809 A1 Oct. 28, 2004

Related U.S. Application Data

(60) Provisional application No. 60/514,383, filed on Oct. 24, 2003, provisional application No. 60/515,897, filed on Oct. 29, 2003, provisional application No. 60/516,232, filed on Oct. 30, 2003.

(30) Foreign Application Priority Data

| Mar. 6, 2003 | (KR) | ..................... 10-2003-0014036 |
| Apr. 29, 2003 | (KR) | ..................... 10-2003-0027199 |
| Oct. 31, 2003 | (KR) | ..................... 10-2003-0076562 |

(51) Int. Cl.
*H04W 4/00* (2006.01)

(52) U.S. Cl. ..................................... 370/331; 455/436
(58) Field of Classification Search ......... 370/229–235, 370/252, 253, 338, 468, 331
See application file for complete search history.

(56) References Cited

U.S. PATENT DOCUMENTS

| 6,073,137 A | 6/2000 | Brown et al. |
| 6,366,778 B1 | 4/2002 | Bender et al. |

(Continued)

FOREIGN PATENT DOCUMENTS

EP 1231807 8/2002

(Continued)

*Primary Examiner*—Ricky Ngo
*Assistant Examiner*—Kan Yuen
(74) *Attorney, Agent, or Firm*—Lee, Hong, Degerman, Kang & Waimey

(57) ABSTRACT

Apparatus and method for controlling data transmission rate in a wireless communication system during handoff comprises a terminal recognizing an active set comprising a serving base station and at least one non-serving base station with respect to the terminal communicating with the network at a first data transmission rate, receiving a first rate control parameter from the serving base station and a second rate control parameter from the at least one non-serving base station, wherein the first and second rate control parameters are associated with determination of a second data transmission rate of the terminal during the handoff and determining the second data transmission rate in response to the first and the second rate control parameters, wherein the second data transmission rate is one of increased rate, decreased rate and same rate from the first data transmission rate.

4 Claims, 8 Drawing Sheets

U.S. PATENT DOCUMENTS

| | | |
|---|---|---|
| 7,411,974 B2 | 8/2008 | Attar et al. |
| 2001/0000750 A1 | 5/2001 | Esteves et al. |
| 2002/0077113 A1 | 6/2002 | Spaling et al. |
| 2003/0007459 A1* | 1/2003 | Yi et al. ................. 370/252 |
| 2003/0112821 A1 | 6/2003 | Clevland et al. |
| 2003/0202497 A1* | 10/2003 | Csapo ................... 370/338 |
| 2003/0232624 A1* | 12/2003 | Toskala et al. ......... 455/509 |
| 2004/0023661 A1* | 2/2004 | Pi et al. ................. 455/450 |

FOREIGN PATENT DOCUMENTS

| | | | |
|---|---|---|---|
| EP | 1 231 807 A2 | | 11/2002 |
| EP | 1 231 807 A3 | | 1/2003 |
| RU | 2000-131196 | | 2/2003 |
| WO | 00/04728 | | 1/2000 |
| WO | WO 00/24568 A1 | | 5/2000 |
| WO | WO 01/24568 A1 | | 4/2001 |
| WO | 02/063781 | | 8/2002 |
| WO | WO 02/063781 A2 | | 8/2002 |
| WO | WO 02/080405 A1 | | 10/2002 |
| WO | WO 02/080406 A1 | | 10/2002 |
| WO | WO 02/100053 A1 | | 12/2002 |

* cited by examiner

APPARATUS AND METHOD FOR CONTROLLING REVERSE-LINK DATA TRANSMISSION RATE

CROSS REFERNCE TO RELATED APPLICATIONS

Pursuant to 35 U.S.C. § 119(a), this application claims the benefit of the Korean Application Nos. 10-2003-0014036, 10-2003-0027199 and 10-2003-0076562 filed on Mar. 6, 2003, Apr. 29, 2003 and Oct. 31, 2003, respectively, the contents of which are hereby incorporated by reference herein in its entirety.

This application also claims the benefit of U.S. Provisional Application Ser. Nos. 60/514,383, 60/515,897, and 60/516,232, filed on Oct. 24, 2003, Oct. 29, 2003 and Oct. 30, 2003, respectively, the contents of which are hereby incorporated by reference herein in its entirety.

BACKGROUND OF THE INVENTION

1. Field of the Invention

The present invention relates to wireless communications systems, and more particularly, to a method of controlling a data transmission rate for a reverse link, in which the status of a mobile station or terminal is used to determine whether an intended data transmission rate can be supported and in turn how to comply with a base station instruction.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G is used to refer to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G is commonly used to refer to the digital cellular systems currently being developed. Recently, third-generation (3G) CDMA communication systems have been proposed including proposals, such as cdma2000 and W-CDMA. These 3G communication systems are conceptually similar to each other with some significant differences.

A cdma2000 system is a third-generation (3G) wideband, spread spectrum radio interface system which uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 1 illustrates a wireless communication network architecture.

Referring to FIG. 1, a subscriber uses a Mobile Station to access network services. The Mobile Station may be a portable communications unit, such as a hand-held cellular phone, a communication unit installed in a vehicle, or even a fixed-location communications unit.

The electromagnetic waves from the Mobile Station are transmitted by the Base Transceiver System (BTS) also known as node B. The BTS consists of radio devices such as antennas and equipment for transmitting radio waves. The Base Station Controller (BSC) receives the transmissions from one or more BTS's. The BSC provides control and management of the radio transmissions from each BTS by exchanging messages with the BTS and the Mobile Switching Center (MSC) or Internal IP Network. The BTS's and BSC are part of the Base Station (BS).

The BS exchanges messages with and transmits data to a Circuit Switched Core Network (CSCN) and Packet Switched Core Network (PSCN). The CSCN Provides traditional voice communications and the PSCN provides Internet applications and multimedia services.

The Mobile Switching Center (MSC) portion of the CSCN provides switching for traditional voice communications to and from an Mobile Station and may store information to support these capabilities. The MSC may be connected to one of more BS's as well as other public networks, for example a Public Switched Telephone Network (PSTN) or Integrated Services Digital Network (ISDN). A Visitor Location Register (VLR) is used to retrieve information for handling voice communications to or from a visiting subscriber. The VLR may be within the MSC and may serve more than one MSC.

A user identity is assigned to the Home Location Register (HLR) of the CSCN for record purposes such as subscriber information, for example Electronic Serial Number (ESN), Mobile Directory Number (MDR), Profile Information, Current Location, and Authentication Period. The Authentication Center (AC) manages authentication information related to the Mobile Station. The AC may be within the HLR and may serve more than one HLR. The interface between the SC and the HLR/AC is an IS-41 standard interface.

The Packet Data Serving Node (PDSN) portion of the PSCN provides routing for packet data traffic to an from Mobile Station. The PDSN establishes, maintains, and terminates link layer sessions to the Mobile Station's and may interface with one of more BS and one of more PSCN.

The Authentication, Authorization and Accounting (AAA) Server provides Internet Protocol authentication, authorization and accounting functions related to packet data traffic. The Home Agent (HA) provides authentication of MS IP registrations, redirects packet data to an from the Foreign Agent (FA) component of the PDSN, and receives provisioning information for users from the AAA. The HA may also establish, maintain, and terminate secure communications to the PDSN and assign a dynamic IP address. The PDSN communicates with the AAA, HA and the Internet via an Internal IP Network.

FIG. 2 illustrates a data link protocol architecture layer for a wireless network.

Referring to FIG. 2, the upper layer contains three basis services; voice services 62, data services 61 and signaling 70. Voice services 62 include PSTN access, mobile-to-mobile voice services, and Internet telephony. Data services 61 are services that deliver any form of data on behalf of a mobile end user and include packet data applications (e.g., IP service), circuit data applications (e.g., asynchronous fax and B-ISDN emulation services), and SMS. Signaling 70 controls all aspects of mobile operation.

The Link Layer 30, is subdivided into the Link Access Control (LAC) sublayer 32 and the Medium Access Control (MAC) sublayer 31. The link layer provides protocol support and control mechanisms for data transport services and performs the functions necessary to map the data transport needs of the upper levels 60 into specific capabilities and characteristics of the physical layer 20. The Link Layer 30 may be viewed as an interface between the upper layers and the Physical Layer 20.

The separation of MAC 31 and LAC 32 sublayers is motivated by the need to support a wide range of upper layer services, and the requirement to provide for high efficiency and low latency data services over a wide performance range (from 1.2 Kbps to greater than 2 Mbps). Other motivators are the need for supporting high QoS delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer manages point-to point communication channels between upper layer entities and provides framework to support a wide range of different end-to-end reliable link layer protocols.

The MAC sublayer 31 facilitates complex multimedia, multi-services capabilities of 3G wireless systems with Quality of Service (QoS) management capabilities for each active service. The MAC sublayer 31 provides procedures for controlling the access of data services (packet and circuit) to the physical layer 20, including the contention control between multiple services from a single user, as well as between competing users in the wireless system. The MAC sublayer 31 also provides for reasonably reliable transmission over the radio link layer using a Radio Link Protocol (RLP) 33 for a best-effort level of reliability. Signaling Radio Burst Protocol (SRBP) 35 is an entity that provides connectionless protocol for signaling messages. Multiplexing and Quality of Service (QoS) Control 34 is responsible for enforcement of negotiated QoS levels by mediating conflicting requests from competing services and the appropriate prioritization of access requests.

The Physical Layer 20, is responsible for coding and modulation of data transmitted over the air. The Physical Layer 20 conditions digital data from the higher layers so that the data may be transmitted over a mobile radio channel reliably.

The Physical Layer 20 maps user data and signaling, which are delivered by the MAC sublayer 31 over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

An optimum rate of data transmission in the reverse link of a mobile communications system, for example, a first-evolution data-optimized (1xEV-DO) system, is determined with respect to the rise-over-thermal of a given base station. The rise-over-thermal is a dynamic reception characteristic defined as total power of signal of total power received at the base station, from all active mobile stations (also referred to as terminals), and the thermal noise detected at the base station. In other words, the rise-over-thermal is the summed signal power of all active-terminal signals received at the base station, which is a function of reverse activity, i.e., the number and transmission rate of active terminals operating in connection with the base station.

Ideal reverse-link conditions result when the rise-over-thermal at the base station is maintained at a constant level despite fluctuations in reverse activity, such that the rise-over-thermal is a function of the various transmission rates for a given number of active terminals. Thus, the system compensates by controlling inter alia the data transmission rate of the reverse link of each terminal. To effect such control, the rise-over-thermal is compared with a threshold value, and based on the comparison results, an active terminal is requested to increase or decrease its transmission rate when communicating with the base station. That is, the transmission rate may be increased when the rise-over-thermal is below the threshold, but if the rise-over-thermal exceeds the threshold, it is necessary to decrease the transmission rate.

FIG. 1 illustrates a reverse-link transmission rate control method according to a related art. In FIG. 1, one base station and one active terminal of a 1xEV-DO system act together in each frame, to set an optimum rate for the next frame of the reverse link.

In step S100, the base station measures the rise-over-thermal (RoT) produced by the cumulative effect of all reverse-link data signals power. With the rise-over-thermal thus determined, the base station generates in a step S110 a reverse activity bit (RAB) as part of an instruction word for use by a terminal. As described above, the RAB value or parameter is set according to a comparison of the rise-over-thermal and a predetermined threshold value, whereby one value would instruct the terminal to decrease its transmission rate, and another value would instruct the terminal to increase its transmission rate. In step S120, the base station transmits the reverse activity bit to all active terminals within active sectors, i.e., terminals transmitting data on the reverse link via a random access channel, which is a common channel. Thus, all terminals simultaneously receive an instruction word containing the same reverse activity bit for a given frame, such that all terminals are simultaneously instructed to increase or decrease their set rate of data transmission for the next frame.

In step S130, the terminal receiving the reverse activity bit performs a compliance test to confirm whether the data transmission rate should be changed based on the received bit. To do so, the terminal considers the data rate of the current frame of the reverse link transmission and, using a predetermined algorithm, determines whether to comply with the instruction from the base station and change the transmission rate accordingly or to ignore the instruction and set the transmission rate of the next frame equal to that of the current frame. Upon completion of the test and in consideration of the reverse activity bit, the terminal sets in a step S140 a data transmission rate of the next frame.

In the above method according to the related art, the reverse activity bit is generated based solely on the rise-over-thermal measured at the base station, and the thus-generated bit is simultaneously transmitted as a single command to all active terminals within active sectors. In other words, there is no consideration of the status of any one of the terminals. As a result, there are inherent disadvantages in adopting this method. For example, from the viewpoint of a terminal, other than complying with the instruction from the base station, the only option for the terminal is to ignore the instruction and maintain the current data transmission rate. Hence, since the terminal cannot act under consideration of its status, reverse-link transmission efficiency tends to suffer. On the other hand, from the viewpoint of a base station, a terminal receiving a reverse activity bit may or may not comply with the corresponding instruction, based on the results of its own test of compliance, and therefore may ignore an instruction to change its transmission rate. Hence, the effective regulation of the rise-over-thermal is hindered, which also degrades the efficiency of the reverse link.

SUMMARY OF THE INVENTION

Accordingly, the present invention is directed to a method that substantially obviates one or more of the problems due to limitations and disadvantages of the related art.

An object of the present invention, which has been devised to solve the foregoing problem, lies in providing a method of controlling a reverse-link data transmission rate, which enables a mobile station (terminal) to transmit data efficiently by considering a resource status and the channel status of the terminal.

It is another object of the present invention to provide a method of controlling a reverse-link data transmission rate, which enhances the efficiency of reverse-link data transmissions in a mobile communications system.

It is another object of the present invention to provide a method of controlling a reverse-link data transmission rate, which reduces the rise-over-thermal felt at a base station of a mobile communications system.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of controlling data transmission rate in a wireless communication system for communicating between a network and a terminal, the method comprising receiving an information parameter from the terminal communicating at a first data transmission rate with the network, wherein the information parameter is associated with at least amount of data to be transmitted to the network; determining a rate control parameter in response to the information parameter, wherein the rate control parameter is associated with controlling the first data transmission rate of the terminal and comprises at least one of first, second and third control states; and transmitting the rate control parameter to the terminal that provided the information parameter to the network to determine a second data transmission rate in response to the rate control parameter, wherein the second data transmission rate is one of increased from, decreased from and same as the first data transmission rate. Preferably, the second data transmission rate is adjusted by a predetermined step in response to the rate control parameter.

According to one aspect of the invention, the information parameter is associated with power capacity transmittable by the terminal and is transmitted on a reverse packet data control channel and associated with the at least one power and data needed for supporting an increased data transmission rate.

According to another aspect of the invention, if the rate control parameter is set to the first control state, then the terminal determines the second data transmission rate to be one of the increased rate if the terminal can support the increased rate, the same rate and the decreased rate from the first data transmission rate. If the rate control parameter is set to the second control state, then the terminal determines the second data transmission rate to be a decreased rate from the first data transmission rate. If the rate control parameter is set to the third control state, then the terminal determines the second data transmission rate to be one of the increased rate if the terminal can support the increased rate and the same rate from the first data transmission rate. The rate control parameter may be set periodically or aperiodically by the network.

According to another aspect of the invention, the rate control parameter comprises one symbol, wherein the symbol comprises at least three states. Preferably, the rate control parameter is transmitted when associated with one of the first and second control states, and is not transmitted when associated with the third control state.

According to one embodiment of the invention, a method of controlling data transmission rate in a terminal comprises the terminal providing an information parameter to and communicating with the network at a first data transmission rate, wherein the information parameter is associated with at least amount of data to be transmitted to the network; receiving from the network a rate control parameter in response to the information parameter, wherein the rate control parameter is associated with controlling the data transmission rate of the terminal and comprises at least one of first, second and third control states; and in response to the rate control parameter, the terminal determining a second data transmission rate, wherein the second data transmission rate is one of increased rate, decreased rate and same rate from the first data transmission rate.

According to another embodiment of the invention, a wireless terminal used in a wireless communication system comprising a network, comprises an antenna; a processor for controlling the mobile station; a display in communication with the processor to display user interface information; and a keyboard in communication with the processor to input user controlled data, wherein the processor comprising means for providing an information parameter to and communicating with the network at a first data transmission rate, wherein the information parameter is associated with at least amount of data to be transmitted to the network; means for receiving from the network a rate control parameter in response to the information parameter, wherein the rate control parameter is associated with controlling the data transmission rate of the terminal and comprises at least one of first, second and third control states; and means for determining a second data transmission rate in response to the rate control parameter, wherein the second data transmission rate is one of increased rate, decreased rate and same rate from the first data transmission rate.

In another embodiment of the present invention, the controlling of data transmission during handoff is described. The method comprises recognizing an active set comprising a serving base station and at least one non-serving base station with respect to the terminal communicating with the network at a first data transmission rate; receiving a first rate control parameter from the serving base station and a second rate control parameter from the at least one non-serving base station, wherein the first and second rate control parameters are associated with determination of a second data transmission rate of the terminal during the handoff; and determining the second data transmission rate in response to the first and the second rate control parameters, wherein the second data transmission rate is one of increased rate, decreased rate and same rate from the first data transmission rate. Preferably, the first rate control parameter comprises a first state associated with increasing the first data transmission rate, a second state associated with decreasing the first data transmission rate and a third state associated with maintaining the first data transmission rate, and the second rate control parameter comprises a fourth state associated decreasing the first data transmission rate.

According to another embodiment of the invention a wireless terminal used in a wireless communication system comprising a network, comprises an antenna; a processor for controlling the mobile station; a display in communication with the processor to display user interface information; and a keyboard in communication with the processor to input user controlled data, wherein the processor comprising means for recognizing an active set comprising a serving base station and at least one non-serving base station with respect to the terminal communicating with the network at a first data transmission rate; means for receiving a first rate control parameter from the serving base station and a second rate control parameter from the at least one non-serving base station, wherein the first and second rate control parameters are associated with determination of a second data transmission rate of the terminal during the handoff; and means for determining the second data transmission rate in response to the first and the second rate control parameters, wherein the second data transmission rate is one of increased rate, decreased rate and same rate from the first data transmission rate.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiment of the present invention, examples of which are illustrated in the accompanying drawings. Wherever possible, the same reference numbers will be used throughout the drawings to refer to the same or like parts. To aid describing the present invention, certain parameter names are being used to describe the channels, messages and variables communicated between mobile and base stations. It should be noted that such parameter names are for illustration purposes only, and that other names may be used to describe the same or similar function.

Figure 1:
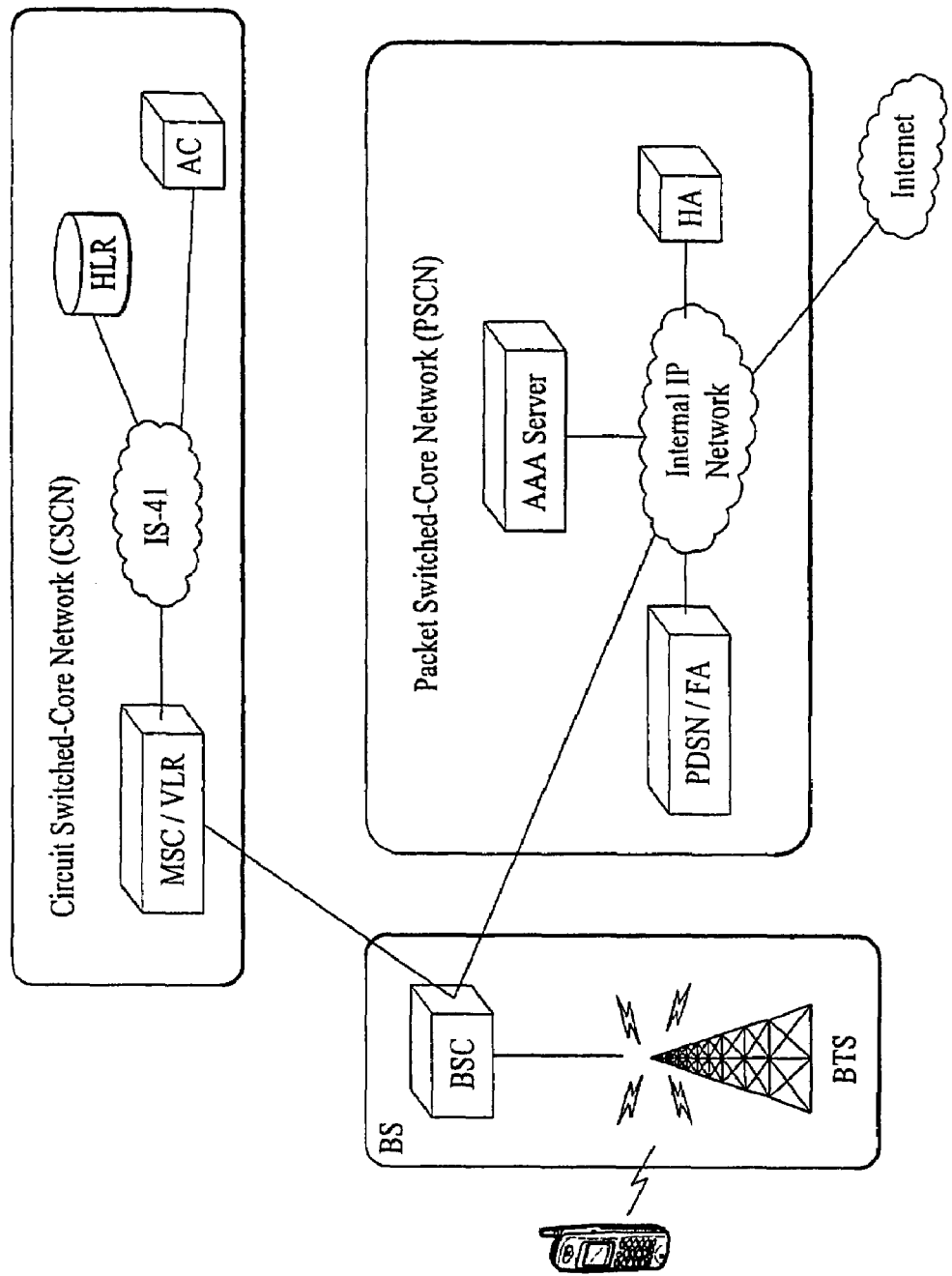
FIG. 1 illustrates a wireless communication network architecture.
Figure 2:
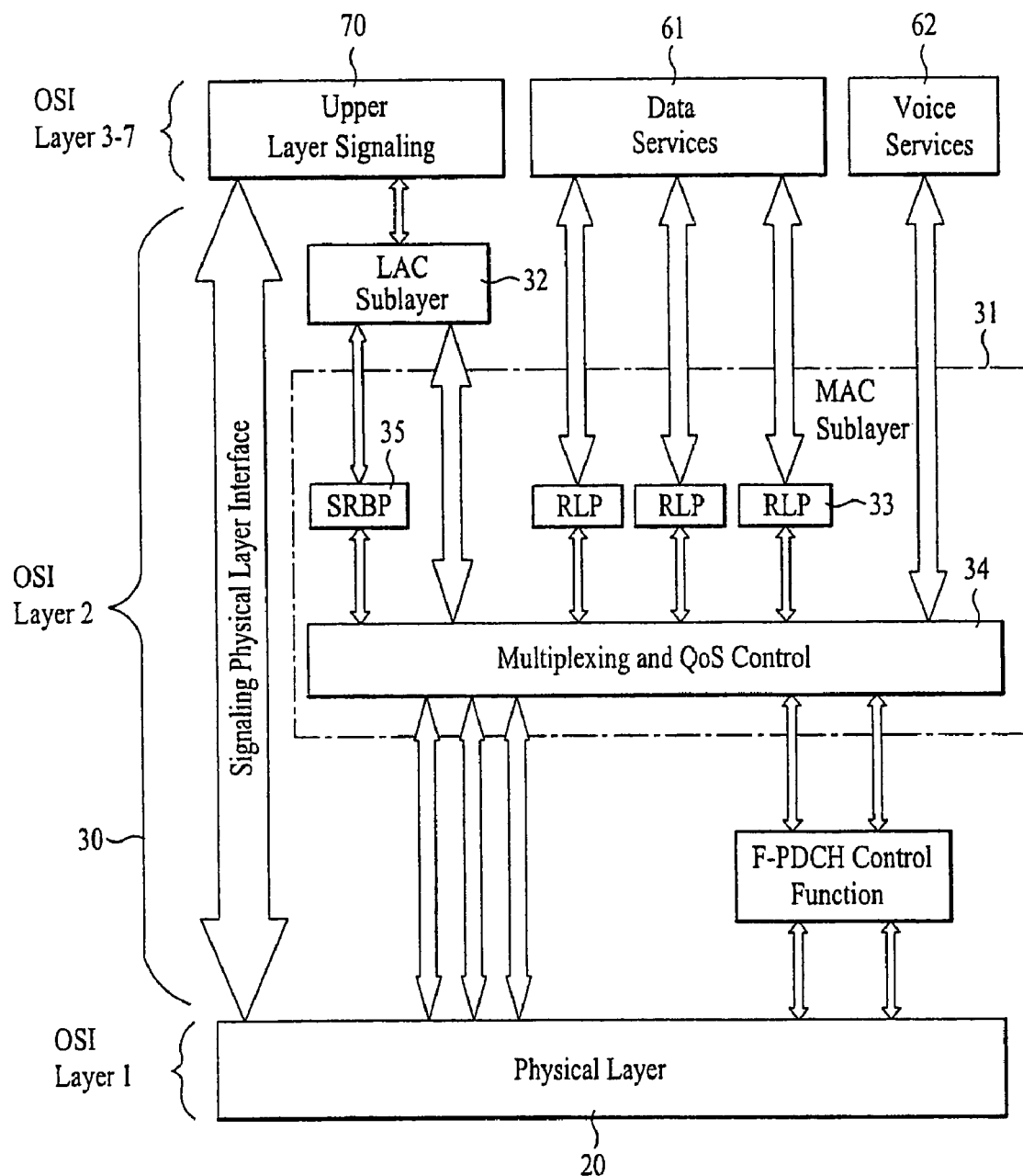
FIG. 2 illustrates a data link protocol architecture layer for a wireless network.
Figure 3:
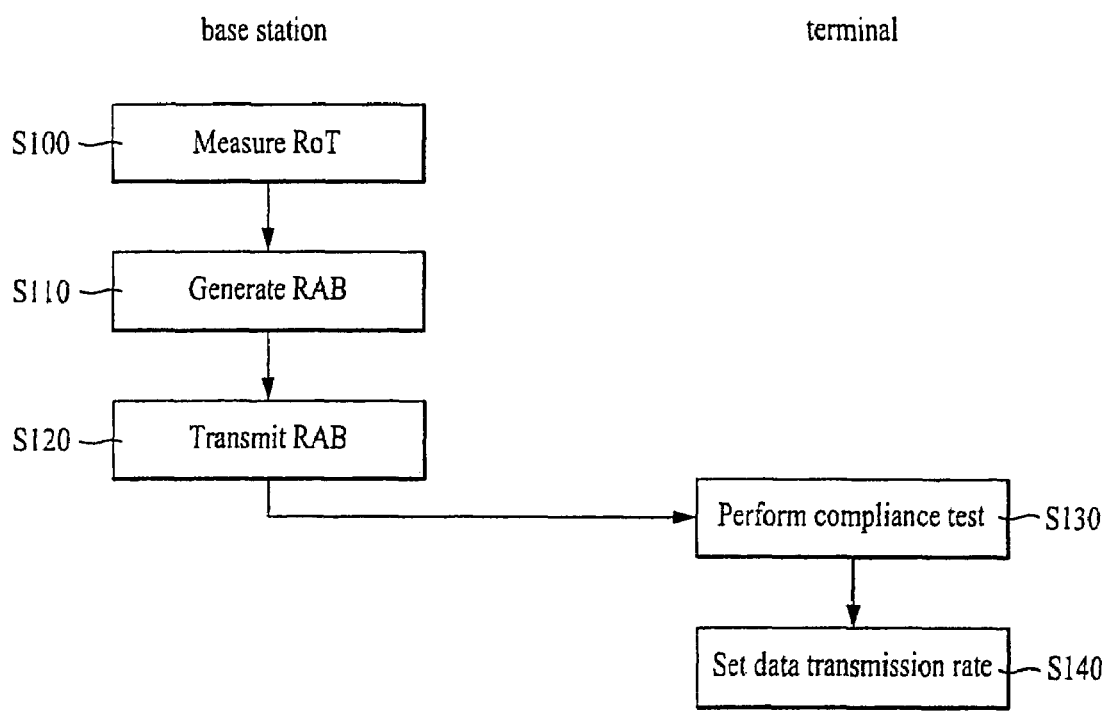
FIG. 3 is a flowchart for controlling a reverse-link data transmission rate according to a related art.

FIG. 3 illustrates a flowchart for controlling a reverse-link data transmission rate in accordance with a preferred embodiment of the present invention. In FIG. 3, at least one base station communicates with one of a plurality of mobile stations or terminals. In reverse-link data transmission, however, it is the terminal rather the base station that typically initiates transmission, which occurs independently of any base station. Thus, in determining the initial rate of transmission, a terminal provided with data to be transmitted to the base station on a reverse link performs one of two processes. In one, data is initially transmitted at the lowest data transmission rate that is currently supportable by the terminal, for example, 9.6 kbps, which is a rate set without interaction from the base station. In the other, data is transmitted from the terminal at a rate determined through a negotiation between terminal and base station, for example, 38.4 kbps. The negotiated transmission rate is set by the terminal after negotiating with the base station of the optimum transmission rate.

Figure 4:
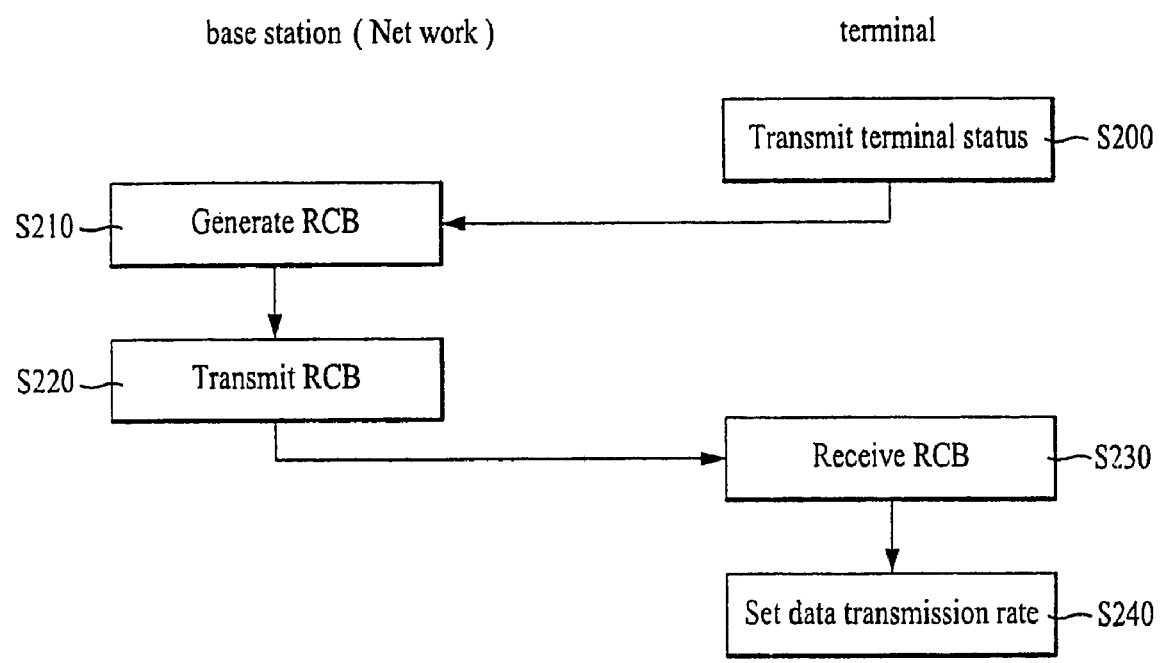
FIG. 4 is a flowchart for controlling a reverse-link data transmission rate in accordance with a preferred embodiment of the present invention.

As shown in step S200 of FIG. 4, at the outset of reverse-link data transmission at a given rate determined as above, a terminal according to the preferred embodiment transmits an information parameter, preferably at least one bit, e.g., a mobile station status information bit, informing the base station of the status of the transmitting terminal. Preferably, the terminal's status may be based on the amount of reserve link transmission power, buffer states, the amount of data to be sent, and other parameters affecting a desirable transmission rate. For subsequent data transmission, however, the reverse-link transmission rate may be governed by, or at least affected by, the based station.

According to the preferred embodiment, the base station generates (S210) and transmits (S220) to each terminal a rate control parameter, preferably at least one symbol of reverse-link data transmission rate control information in the form of a rate control bit (RCB) dedicated to each terminal in a cell. The RCB preferably comprises a symbol wherein each symbol represents tri-states, for example, +1, 0 or −1. In generating a dedicated RCB for each of a plurality of terminals, the base station considers a variety of factors, including the channel status of the reverse links, the terminal status information bits, the status of resources and the forms of their services, the rise-over-thermal, etc.

It should be noted that the RCB information may comprise more than one symbol for use by the corresponding terminal, but one symbol can be used to indicate either of two or any of three states. In the event of a two state RCB, for example, a single bit of RCB information, one logic state may indicate an instruction to increase the data transmission rate of the terminal, with another logic state indicating an instruction to decrease its data transmission rate. In such a case, a third state may be indicated by the absence of RCB information from the base station, which signifies a hold instruction to maintain the data transmission rate. Accordingly, the RCB information contains instruction information to increment, decrement, or maintain the data transmission rate of a predetermined terminal and thereby set the data transmission rate of the reverse link. Here, a negotiation process between the base station and terminal may be employed to set the size or number of increments/decrements to be executed for any one transmitted instruction.

In generating the above RCB information for transmission to a terminal, the base station considers such parameters as the rise-over-thermal and the terminal's reverse-link channel status and terminal status information bit and determines whether to request increase, decrease, or maintain its current data transmission rate. The RCB information is then transmitted to the terminal, preferably either periodically or aperiodically, by assigning a minimum transmission time unit of, for example, 20 ms, during each of which the base station performs at most one transmission of RCB information.

The terminal receives the RCB (S230) and sets accordingly (S240) the data transmission rate for each frame, to control the rate of the reverse link. The control operation is detailed in FIG. 5.

Figure 5:
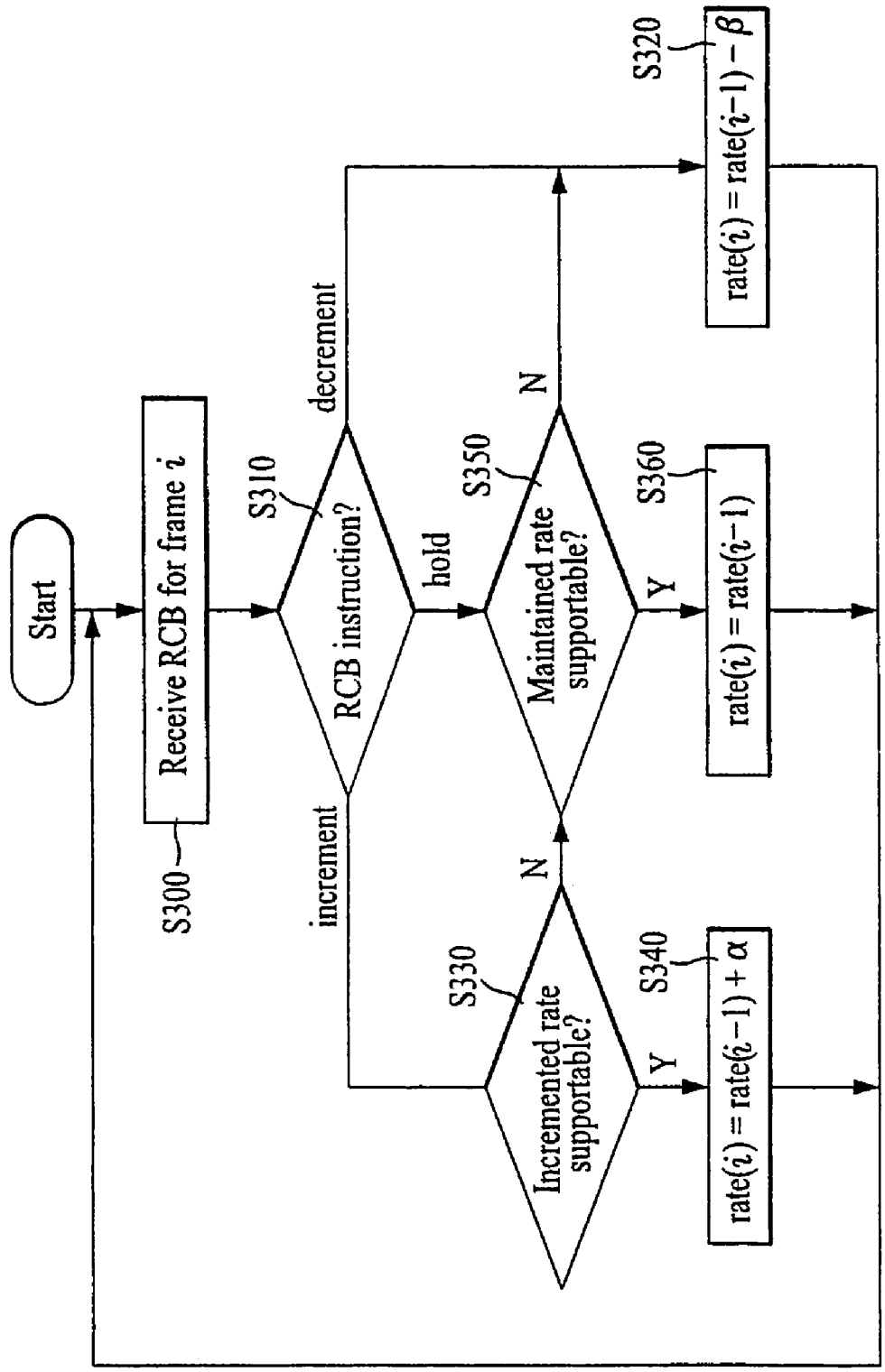
FIG. 5 is a flowchart for setting the data transmission rate at the terminal according the preferred embodiment of the present invention.

FIG. 5 illustrates a flowchart for controlling a data transmission rate according to the preferred embodiment of the present invention, in which the status of a terminal adopting the method is based on buffer status, the amount of power available to the terminal, and the like. The terminal's status is used to determine whether an intended increase or decrease in data transmission rate can be supported and in turn whether the instruction indicated by an RCB should be executed. In FIG. 5, an optimum data transmission rate for a frame i is determined by a corresponding terminal based on a received RCB indicating an instruction of one of incrementing the data transmission rate of the next frame by a negotiated value α, decrementing the data transmission rate of the next frame by a negotiated value β, and maintaining the current rate for the next frame.

Preferably, the increase and decrease of the transmission rate by value α and value β may be implemented by increasing or decreasing the rate by predetermined steps. For example, if the incremented rate is supportable, then the terminal may increase the present transmission rate to a rate that is one level higher among a plurality of transmission rates supported by the terminal. Similarly, if the decrement rate is supportable, then the terminal may decrease the present transmission rate to a rate that is one level lower among a plurality of transmission rates supported by the terminal.

Upon reception of a dedicated RCB for a given frame by a corresponding terminal (S300), the terminal checks the value of the received RCB (S310) and determines the intended instruction of the base station. If the value of the received RCB indicates a decrement instruction, the data transmission rate is decreased by a decrement value β with respect to the rate of the previous frame (S320).

If the value of the received RCB indicates an increment instruction, the terminal checks its status to determine whether an incremented data transmission rate can be supported (S330). If so, the data transmission rate is increased by an increment value α with respect to the rate of the previous frame (S340); otherwise, a further determination is made to see if the terminal can continue to support the current rate being used in the current frame. That is, if the terminal status is unable to support the data transmission rate increment or if the value of the received RCB indicates a maintain instruction, the terminal checks its status to determine whether a maintained data transmission rate can be supported (S350). If so, the data transmission rate is maintained at the rate of the previous frame (S360); otherwise, the data transmission rate is decreased by a decrement value β with respect to the rate of the previous frame.

If the value of the received RCB indicates an increment instruction but the terminal status is unable to support the incremented or a maintained data transmission rate; or if the value of the received RCB indicates a maintain instruction but the terminal status is unable to support the maintained data transmission rate; or if the value of the received RCB indicates a decrement instruction, the terminal decreases its data transmission rate by a decrement value β with respect to the rate of the previous frame. In short, the data transmission rate can be increased, decreased, or maintained according to the terminal status if the terminal receives an RCB indicating an increment instruction, but if the terminal receives an RCB indicating a maintain instruction, the data transmission rate should be decreased or maintained according to the terminal status, and if the terminal receives an RCB indicating a decrement instruction, the data transmission rate should be decreased.

The above description is related to a terminal which is not in a handoff condition. Under a handoff condition, the terminal communicates, for example, with a serving sector and one or more non-serving sectors in an active set. The active set is a list of pilots that are being used for the current communication. In other words, the active set is the list of sectors that are in communication with the mobile station.

In transmitting a dedicated RCB to a corresponding terminal under handoff conditions, such as during a soft handoff, a base station and/or terminal may employ one of four schemes to set a new transmission rate based on the RCB information received from a plurality of sectors in the active set.

In the first transmission scheme, a base station controller (BSC), which controls one or more base stations (namely BTS), generates one RCB and transmits the generated RCB to every base station in all active sectors managed by the base station controller, such that a terminal in a soft handoff area receives the same RCB from more than one base station. The difference in distances from the terminal to each base station results in a corresponding differentiation in the energy levels of each RCB received by the terminal, which combines the energy levels to acquire one RCB satisfying conditions to meet a target error rate. Depending on the RCB value (increase, decrease or maintain) received from the base station, the terminal determines the data transmission rate for the next frame in accordance with steps S310-S360 of FIG. 5. For example, if the RCB value is associated with the increasing the transmission rate, then the terminal may set the transmission rate to one of increased, decreased or maintained rate depending on the terminal status described above. If the RCB value is associated with the maintaining the transmission rate, then the terminal may set the transmission rate to one of decreased or maintained rate depending on the terminal status. If the RCB value is associated with the decreasing the transmission rate, then the terminal decreases the transmission rate in next frame.

In the second transmission scheme, a base station controller respectively generates an RCB for the base station of each active sector for transmission to a terminal in a soft handoff area. In this case, the terminal receives RCB information from more than one base station (for example BTS), which may be conflicting, and the terminal determines which RCB information to use in determining the new transmission rate. For instance, if the RCB information received from any one of the base stations is associated with decreasing the transmission rate, then the terminal decreases the transmission rate, for example, in the next frame. If none of the RCB information received from multiple base stations is not associated decreasing the transmission rate, and there is at least one RCB information that is associated with maintaining or holding the present transmission rate, then the terminal will either maintain or decrease the transmission rate depending on the terminal status. If none of the RCB information received from multiple base stations is not associated decreasing or maintaining the transmission rate, and there is at least one RCB information that is associated with increasing the present transmission rate, then the terminal will increase, maintain or decrease the transmission rate depending on the terminal status.

Figure 6:
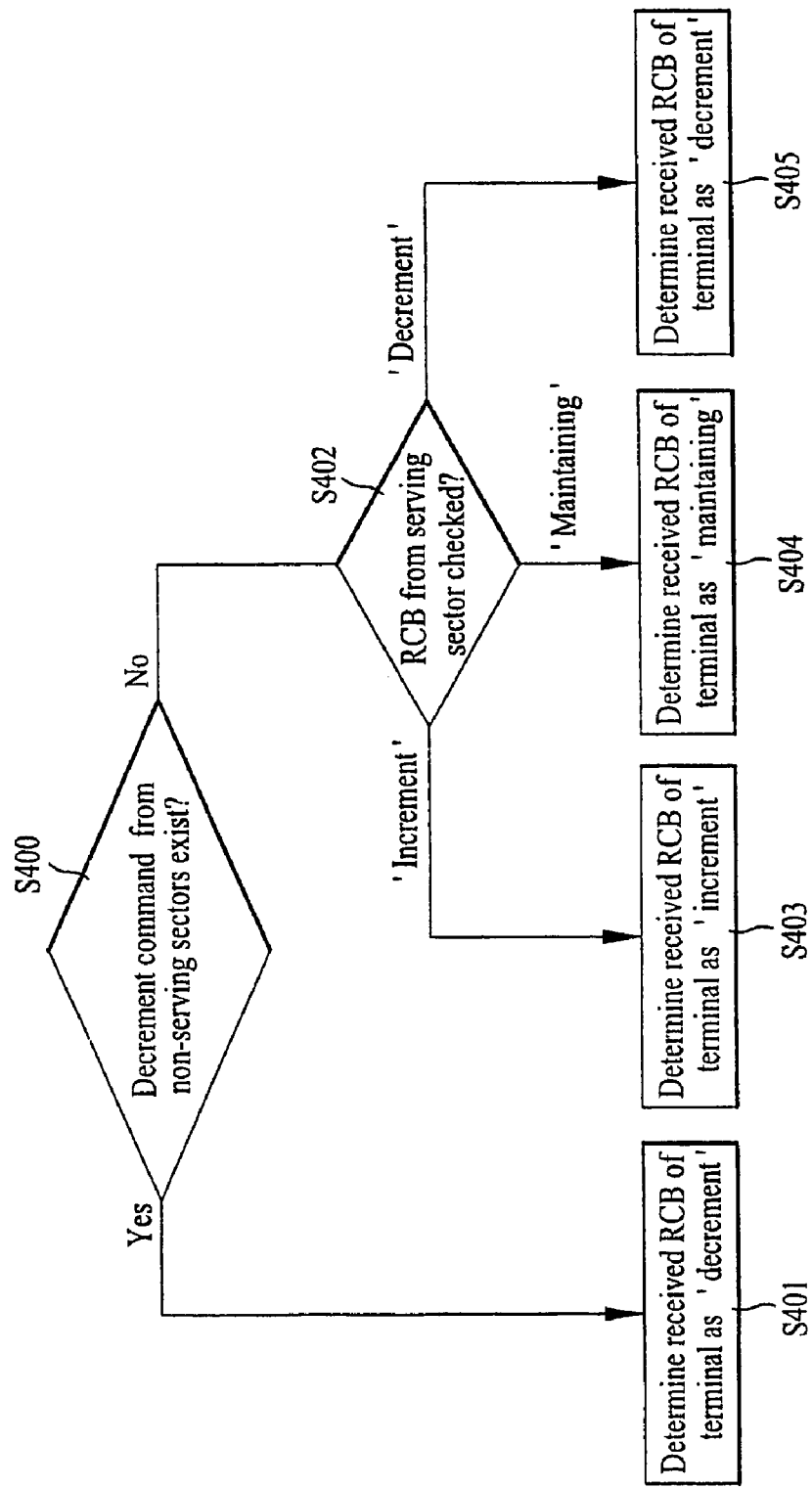
FIG. 6 illustrates a transmission scheme under handoff condition according to the preferred embodiment of the present invention.

FIG. 6 illustrates a third transmission scheme under handoff condition according to a preferred embodiment of the present invention. In a third transmission scheme, only an RCB indicating a decrement instruction may be transmitted to a corresponding terminal from a base station of a non-serving sector in the active set. That is, the base station associated with the non-serving sector does not transmit RCB information indicating to increase or maintain the data transmission rate, but a base station associated with a serving sector may transmit RCB information indicating to increase, decrease, or maintain the data transmission rate to the corresponding terminal. To do so, in step S400, a terminal first determines whether an RCB indicating a decrement instruction is received from a base station of a non-serving sector. If the terminal receives at least one such RCB (containing decrease command), the terminal decreases the transmission rate as shown in step S401. If the RCB information from the non-serving sector is not associated with decreasing the transmission rate, then the terminal checks the RCB information received from the serving base station (e.g., BTS) in step S402. If the RCB information from the serving base station is to increase the transmission rate (S403), then the terminal determines the next transmission rate in accordance with steps S310 to S360 of FIG. 5. If the RCB information from the serving base station is to maintain the transmission rate (S404), then the terminal determines the next transmission rate in accordance with steps S310 to S360 of FIG. 5. If the RCB information from the serving base station is to decrease the transmission rate (S405), then the terminal changes the next transmission rate to a decreased rate from the present transmission rate.

In a fourth transmission scheme, base stations of non-serving sectors do not transmit an RCB to a corresponding terminal, such that the terminal receives an RCB only from a base station of a serving sector. Based on the RCB received from the serving base station, the terminal determines the next transmission rate in accordance with steps S310-S360 of FIG. 5.

Figure 7:
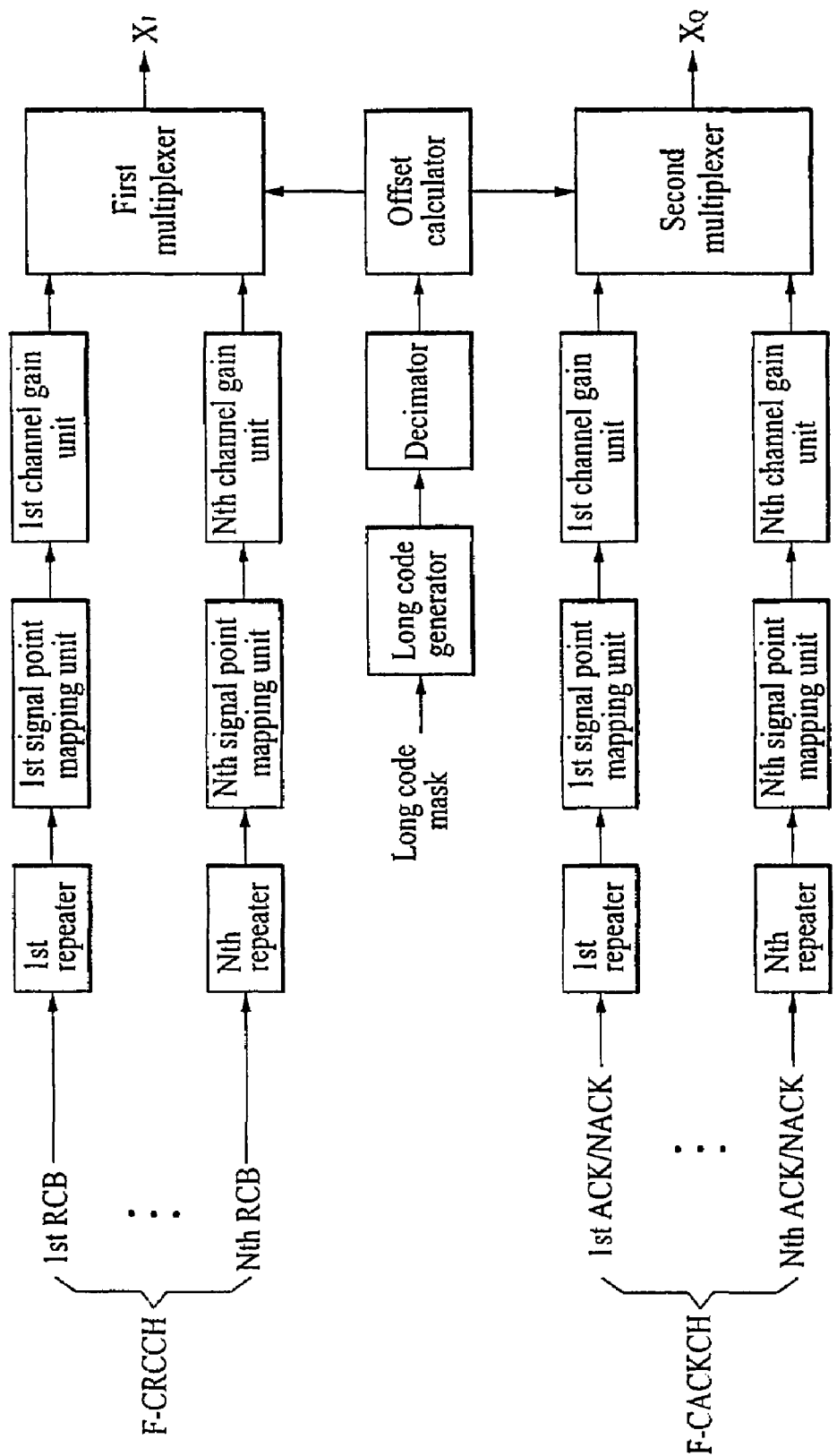
FIG. 7 is a block diagram of a channel structure for transmitting a plurality of rate control bits and a corresponding plurality of ACK/NACK bits, to implement the preferred embodiment of the present invention.

As described above, the base stations communicate with one terminal. In practice, however, a plurality of active terminals are present in any one cell. To achieve this, a dedicated RCB may be respectively generated for and transmitted to each of a plurality of terminals via one common channel. FIG. 7 shows an exemplar configuration of the common channel, referred to here as a forward-link common rate control channel (F-CRCCH), which is multiplexed with a forward-link common acknowledgment channel (F-CACKCH) for transmitting a corresponding plurality of ACK/NACK bits dedicated to reverse-link packets transmitted from the plurality of terminals. The channel configuration is achieved using a repeater, a signal point mapping unit, and a channel gain unit for each dedicated RCB for a plurality (1 through N) of terminals and corresponding elements for each ACK/NACK bit. Meanwhile, a long code is generated in a long code generator for input to a decimator, and the decimator output is input to an offset calculator. The outputs of the first and second multiplexers are quadrature phase shift keying signals $X_I$ and $X_Q$.

Therefore, according to the method of the present invention, the base station transmits dedicated data transmission rate control information for the respective terminals, considering the rise-over-thermal, buffer states, and the status of reverse links, to reduce the rise-over-thermal and enhance the efficiency of reverse-link data transmission.

Figure 8:
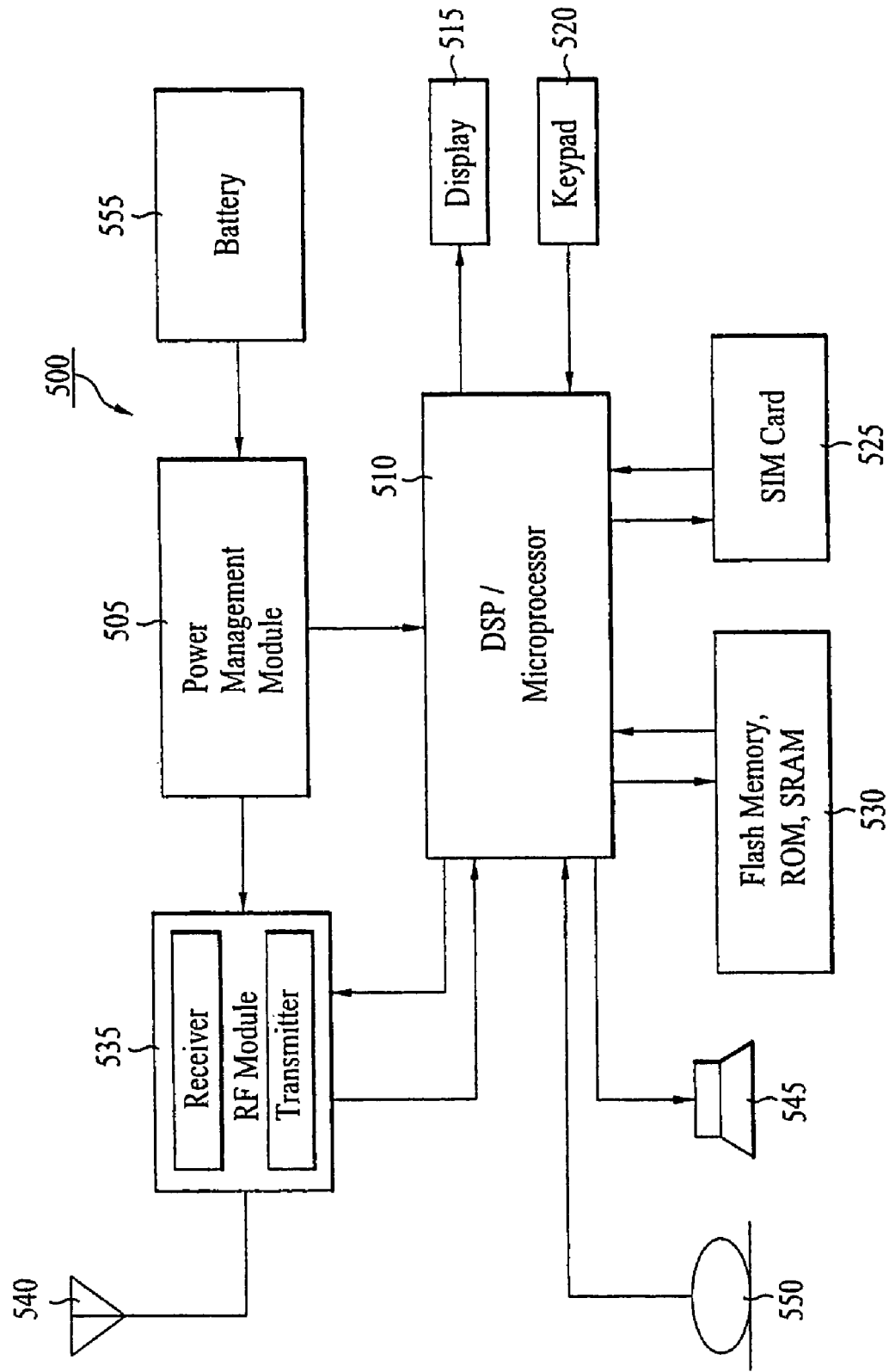
FIG. 8 illustrates a block diagram of mobile station according to the preferred embodiment of the present invention.

FIG. 8 illustrates a block diagram of mobile station according to the preferred embodiment of the present invention.

Referring to FIG. 8, the mobile station 500 comprises a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF section 535, to initiate communication, for example, transmit radio signals comprising voice communication data. The RF section 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example.

It will be apparent to one skilled in the art that the preferred embodiments of the present invention can be readily implemented using, for example, the processor 510 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of mobile communication system, such as cdma2000. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling data transmission rate in a wireless communication system during handoff for communicating between a network and a terminal, the method comprising:

recognizing an active set comprising at least two base stations in communication with the terminal at a first data transmission rate;

receiving at least one rate control parameter from at least one of the at least two base stations, wherein the at least one rate control parameter is associated with determining a second data transmission rate of the terminal during the handoff; and determining the second data transmission rate using the at least one rate control parameter, wherein the second data transmission rate is either an increased rate, a decreased rate or a same rate relative to the first data transmission rate, wherein the second data transmission rate is determined to be the decreased rate relative to the first data transmission rate if the at least one rate control parameter is received from a non-serving base station and indicates to decrease the first data transmission rate and any rate control parameter received from a serving base station is disregarded, wherein the second data transmission rate is determined using the rate control parameter received from the serving base station if no rate control parameter indicating to decrease the first data transmission rate is received from the non-serving base station, wherein the rate control parameter received from the serving base station comprises either a first state associated with an instruction to increase the first data transmission rate, a second state associated with an instruction to decrease the first data transmission rate or a third state associated with an instruction to maintain the first data transmission rate.

2. The method of claim 1, wherein the second data transmission rate is set to the decreased rate relative to the first transmission rate if the rate control parameter from the serving base station is associated with an instruction to decrease the first data transmission rate.

3. The method of claim 2, wherein the second data transmission rate is set to the decreased rate or the same rate relative to the first data transmission rate based on transmission capabilities of the terminal if the rate control parameter received from the serving base station is associated with an instruction to maintain the first data transmission rate.

4. The method of claim 1, wherein the second data transmission rate is set to either of the increased rate, the decreased rate or the same rate relative to the first data transmission rate based on transmission capabilities of the terminal if the rate control parameter received from the serving base station is associated with an instruction to increase the first data transmission rate.

* * * * *